US 6,744,011 B1

(12) United States Patent
Hu et al.

(10) Patent No.: US 6,744,011 B1
(45) Date of Patent: Jun. 1, 2004

(54) ONLINE MONITORING SYSTEM AND METHOD FOR A SHORT-CIRCUITING GAS METAL ARC WELDING PROCESS

(75) Inventors: Shixin Jack Hu, Ann Arbor, MI (US); Yunxian Chu, Milpitas, CA (US); Wenkao Hou, Ypsilanti, MI (US); Samuel Paul Marin, Oakland Township, MI (US); Pei-Chung Wang, Troy, MI (US)

(73) Assignees: General Motors Corporation, Detroit, MI (US); University of Michigan, Ann Arbor, MI (US)

( * ) Notice: Subject to any disclaimer, the term of this patent is extended or adjusted under 35 U.S.C. 154(b) by 0 days.

(21) Appl. No.: 10/305,377

(22) Filed: Nov. 26, 2002

(51) Int. Cl.$^7$ ............................................... B23K 9/095
(52) U.S. Cl. ................................................. 219/130.01
(58) Field of Search ........................ 219/130.01, 130.21, 219/130.31, 130.32, 130.33

(56) References Cited

U.S. PATENT DOCUMENTS

| | | | | |
|---|---|---|---|---|
| 5,756,967 A | * | 5/1998 | Quinn et al. ........... | 219/130.01 |
| 6,031,203 A | * | 2/2000 | Suzuki et al. .......... | 219/130.01 |
| 6,133,545 A | * | 10/2000 | Okazaki et al. ........ | 219/130.01 |
| 6,236,017 B1 | * | 5/2001 | Smartt et al. .......... | 219/130.01 |

OTHER PUBLICATIONS

"Through–Arc" Process Monitoring Techniques for Control of Automated Gas Metal Arc Welding by Darren Barborak, Chris Conrady, Bruce Madigan & Tony Paskell, May 1999.
"A Fuzzy Logic System for Process Monitoring and Quality Evaluation in GMAW" by C.S. Wu, T. Polte and D. Rehfeldt, Feb. 2001.

* cited by examiner

Primary Examiner—Clifford C. Shaw
(74) Attorney, Agent, or Firm—Kathryn A. Marra (57) ABSTRACT

The present invention generally relates to a useful online monitoring system and method of user thereof for monitoring a welding process to determine weld quality, weld process stability, and weld geometry for each weld formed during a welding process. More particularly, the online monitoring system has a computer having a graphical user interface (GUI); at least one welding machine; a communication interface for interfacing communication between the at least one welding machine and the computer; a data acquisition system for acquiring welding signal data, the data acquisition system having an associated memory means; a quality management database for managing and storing acquired welding signal data; and a statistical signal processing system in communication with the data acquisition system for processing welding signal data stored in the data acquisition system associated memory means, and in further communication with the communication interface for communicating processed welding signal data to the GUI.

18 Claims, 9 Drawing Sheets

ONLINE MONITORING SYSTEM AND METHOD FOR A SHORT-CIRCUITING GAS METAL ARC WELDING PROCESS

TECHNICAL FIELD

The present invention relates to an efficient method and system for online monitoring of a short circuiting gas metal arc welding process to determine weld quality, process stability, and geometry estimation.

BACKGROUND OF THE INVENTION

Gas metal arc welding (hereinafter "GMAW") of automotive thin sheets involves the use of low currents, preferably less than 150 amps, for causing transfer of metal to occur when the welding apparatus is in a short-circuiting mode. GMAW is commonly operated in automatic or semi-automatic modes and utilized in high production welding operations. However, the practice of short-circuiting GMAW to consistently produce high quality welds is regarded generally as quite difficult due to a resulting intermittent welding arc and short-circuiting metal transfer.

Existing methods for inspecting the quality of welds include, for example, trial and error, visual inspection, destructive testing, and arc sensing. Current industry methods of monitoring welding processes and weld quality are thus heavily dependent on the knowledge, sensory perception and experience of welders, which render the methods labor-intensive, subjective and frequently inefficient. They also tend to involve analysis that occurs after the weld has been made; and do not allow for an early opportunity to scrap a part or take remedial measures to fix the weld.

It would be desirable to be able to continuously monitor weld stability, quality or geometry during a welding process, in real-time. It would be especially desirable to have a system that, based upon feedback from the monitoring, could adjust one or more welding process parameters for improving weld stability, quality or geometry (e.g., the weld length, the sample rate frequency, the short-circuiting current, the arc current, the short-circuiting voltage, the arc voltage, or otherwise).

SUMMARY OF THE INVENTION

The present invention provides an efficient method and system for meeting the above desires, by providing an improved approach for analyzing the stability of metal transfer and the weld quality in a short-circuiting gas metal arc welding process. The method and system use the welding current and voltage signals produced during the welding process and therefore, require no additional sophisticated hardware be added to the whole welding system. The system is particularly useful, when used in accordance with the present invention, for analyzing the process stability and weld quality of GMAW of low carbon sheet steel.

The system can monitor every welding process and record the quality information into a quality management database for statistical analysis and process control. More particularly, a graphical user interface (hereinafter "GUI") can display welding signals, signal processing results, stability analysis results, weld-quality information to detect signal welding problems, monitor weld quality, improve weld quality, and thereby, increase productivity.

More particularly, the online monitoring system for monitoring a welding process comprises:

(a) a computer having
   (i) a controlling microprocessor, and
   (ii) a graphical user interface;
(b) at least one welding machine in operable communication with the computer;
(c) a communication interface for interfacing communication between the at least one welding machine and the computer;
(d) a data acquisition system in operable communication with the controlling microprocessor and in further communication with the at least one welding machine for acquiring welding signal data from the at least one welding machine, the data acquisition system having an associated memory means;
(e) a quality management database for storing at least one of welding signal data, monitoring results, and diagnostic results in the data acquisition system associated memory means; and
(f) a statistical signal processing system in communication with the data acquisition system for processing the welding signal data stored in the data acquisition system associated memory means and in further communication with the communication interface for communicating processed welding signal data to the GUI.

Additionally, there is provided a method of use of the online monitoring system to monitor and control a gas metal arc welding process according to a user defined format comprising the steps of:

a) setting welding and data acquisition parameters;
b) setting a welding voltage's first rising edge as a triggering signal to start a data acquisition process;
c) determining whether the triggering signal was received;
d) waiting for a triggering signal if a triggering signal was not received;
e) determining whether to perform an off-line signal analysis if a triggering signal was not received;
f) repeating steps c)–e) if an off-line signal analysis is not needed;
g) performing an off-line signal analysis if an off-line signal analysis is needed;
h) loading existing voltage and current data stored in a data acquisition memory means when an off-line signal analysis is performed;
i) acquiring current and voltage from an active welding cycle upon receiving a triggering signal;
j) performing signal processing algorithms on the acquired or the loaded current and voltage data.

BRIEF DESCRIPTION OF THE DRAWINGS

These and other objects, features and advantages of the present invention will become apparent from the following detailed description and the appended drawings in which.

DETAILED DESCRIPTION OF THE PREFERRED EMBODIMENT

The invention provides a useful system and method for using an online monitoring system having a graphical user interface (hereinafter "GUI") to communicate with a data acquisition and a statistical signal processing system to determine weld quality, weld process stability, weld geometry or a combination thereof, for each selected weld formed during a welding process, such as a gas metal arc welding process as applied in welding low carbon sheet steel.

Figure 1:
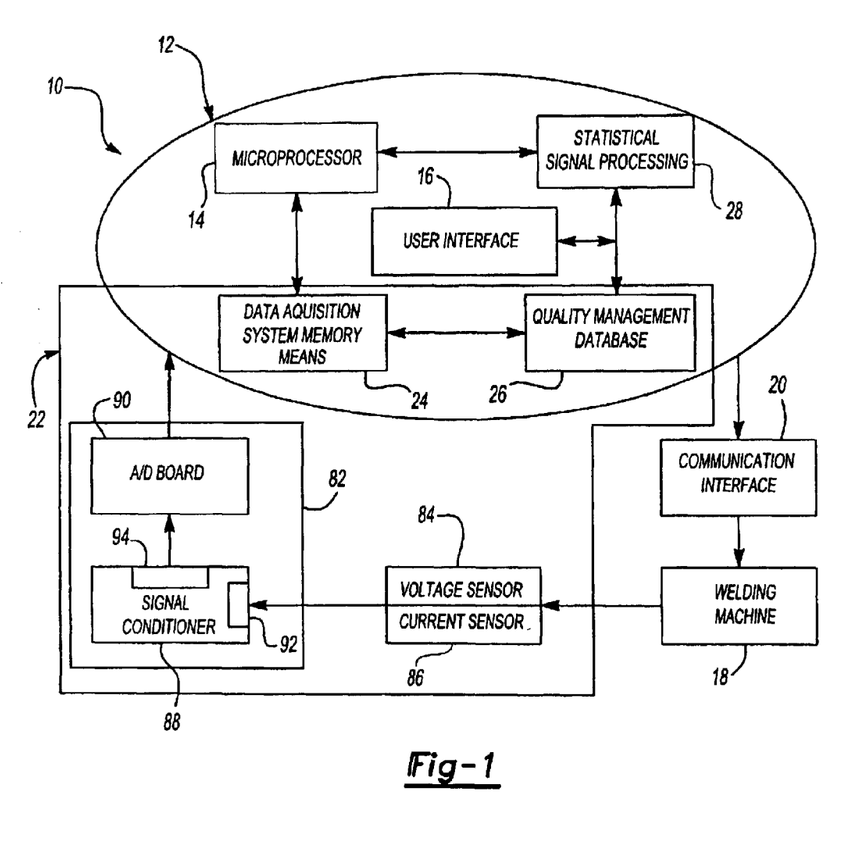
FIG. 1 is a schematic of an online monitoring system in accordance with a preferred embodiment of the present invention.

In general, as shown in FIG. 1, one embodiment of an online monitoring system 10 for monitoring a welding process contemplates a computer system 12 having a controlling microprocessor 14, and an associated GUI 16. At least one welding machine 18 is in operable communication with the computer system 12. A communication interface 20 provides interfacing communication between the welding machine 18 and the computer system 12. The computer system 12 also includes a data acquisition system 22 adapted for acquiring welding signal data from the welding machine 18 (the data acquisition system 22 having an associated memory means 24). A quality management database 26 of the computer system is provided for storing at least one of welding signal data, monitoring results, and diagnostic results into the data acquisition system associated memory means 24. The computer system 12 also includes a statistical signal processing system 28 in communication with the data acquisition system 22 for processing the welding signal data stored in the data acquisition system associated memory means 24. The statistical signal processing system may be in further communication with the communication interface 20 for communicating processed welding signal data to the GUI 16.

The computer system 12 for the online weld monitoring system preferably is a stand-alone system which self-boots on system power up. The controlling microprocessor 14 monitors and controls communications to the welding machine 18. Additionally, the microprocessor 14 is such that it can be configured, such as by the GUI 16, to provide welding parameters through the communication interface 20 to the welding machine 18 and to provide data acquisition parameters 30 through the communication interface 20 to the data acquisition system 22.

Among other functions performed, the GUI 16 is adapted for displaying analog voltage and analog current signals communicated from the welding machine 18 to the quality management database 26. The signals can be graphically displayed on the GUI 16, and optionally, according to a user-defined format. In this manner, a user can obtain real-time information about the welding process being performed assisted by use of the GUI 16.

Turning now in more detail to the GUI 16, it is seen from FIGS. 2–6, the GUI 16 is adapted for providing weld process information simultaneously, consecutively or both, to the user, and as such it includes at least one monitoring window 32. Within the monitoring window 32, a user will be able to select from one or more of a plurality of sub-displays adapted for providing different types of process information.

Figure 4:
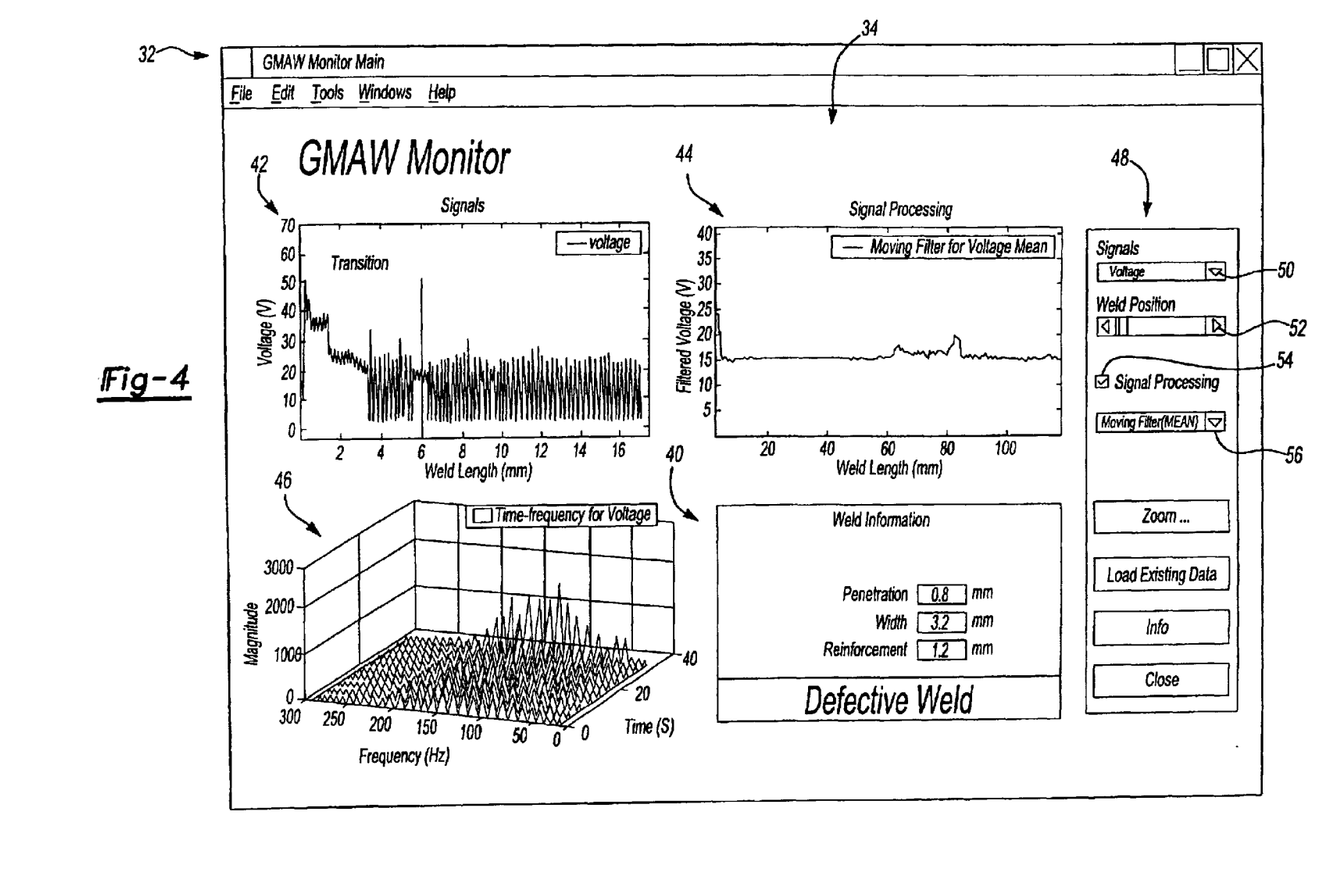
FIG. 4 is an illustration of an online monitoring display graphically showing multi-frequency components of a spectrum analysis indicating an unstable welding process producing defective welds.
Figure 5:
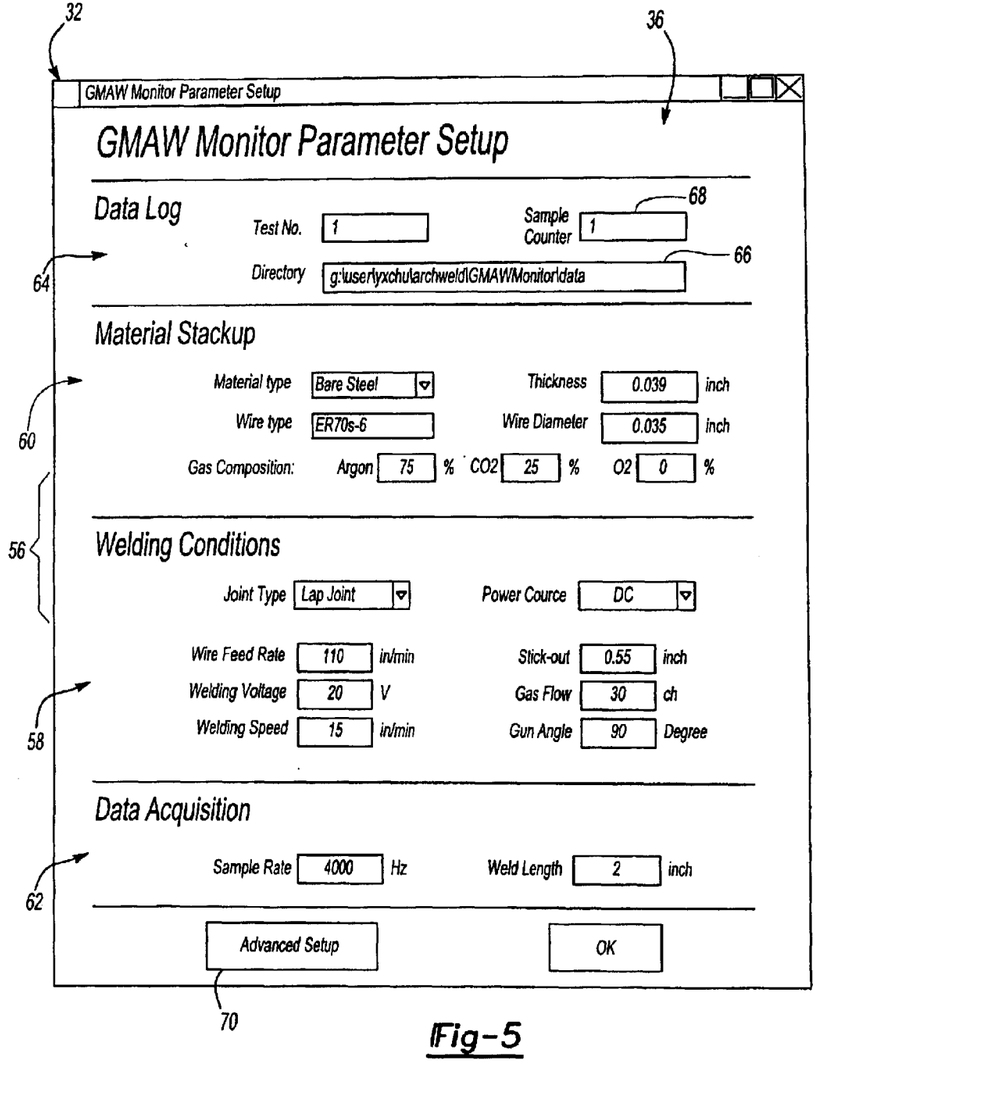
FIG. 5 is an illustration of a welding parameter setup display.
Figure 6:
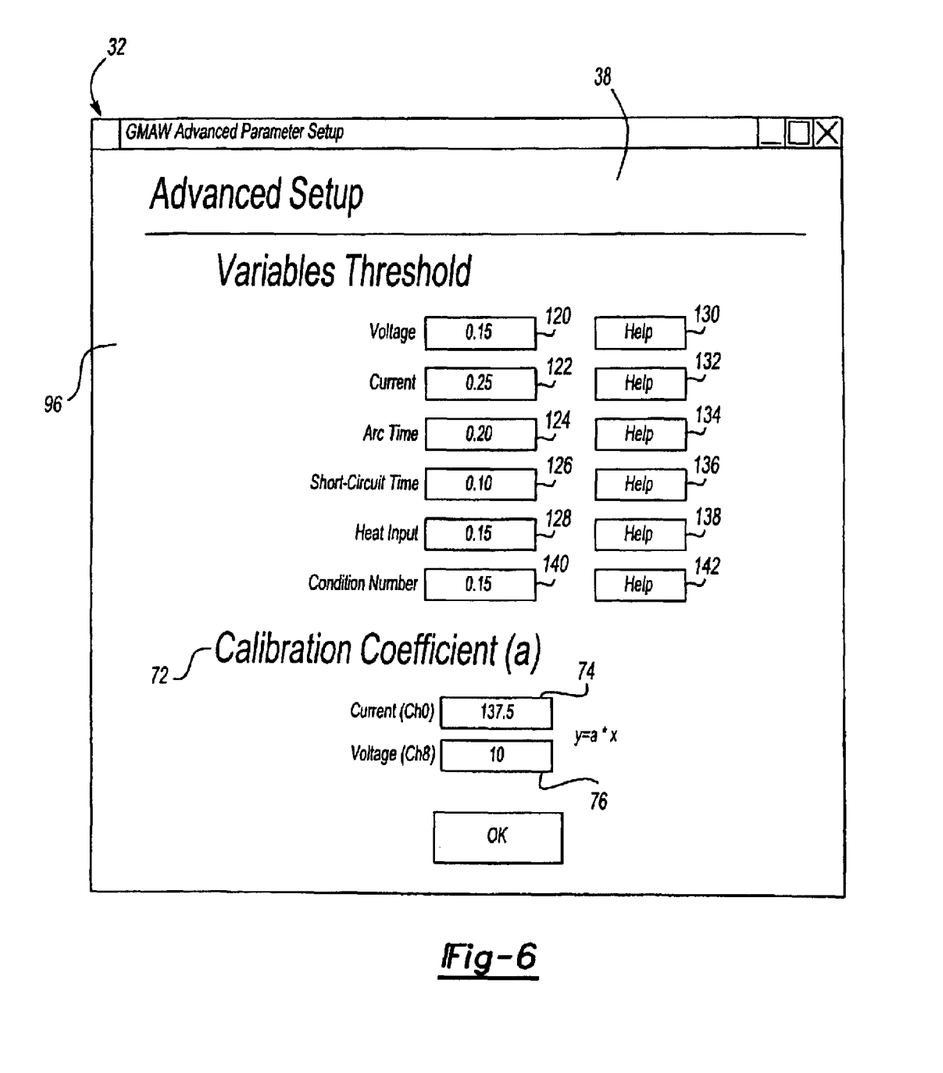
FIG. 6 is an illustration of an advanced setup display.

For example, as seen in FIGS. 2–6, one preferred monitoring window 32 might include a display selected from the group consisting of an online monitoring display 34 (FIGS. 2–4), a parameter setup display 36 (FIG. 5), and an advanced setup display 38 (FIG. 6). Of course, the above is not intended as limiting, and additional displays may be added according to a user's preference. As seen, each of the displays has one or a plurality pre-programmed fields, optionally along with one or a plurality of additional fields into which a user may input data.

Figure 2:
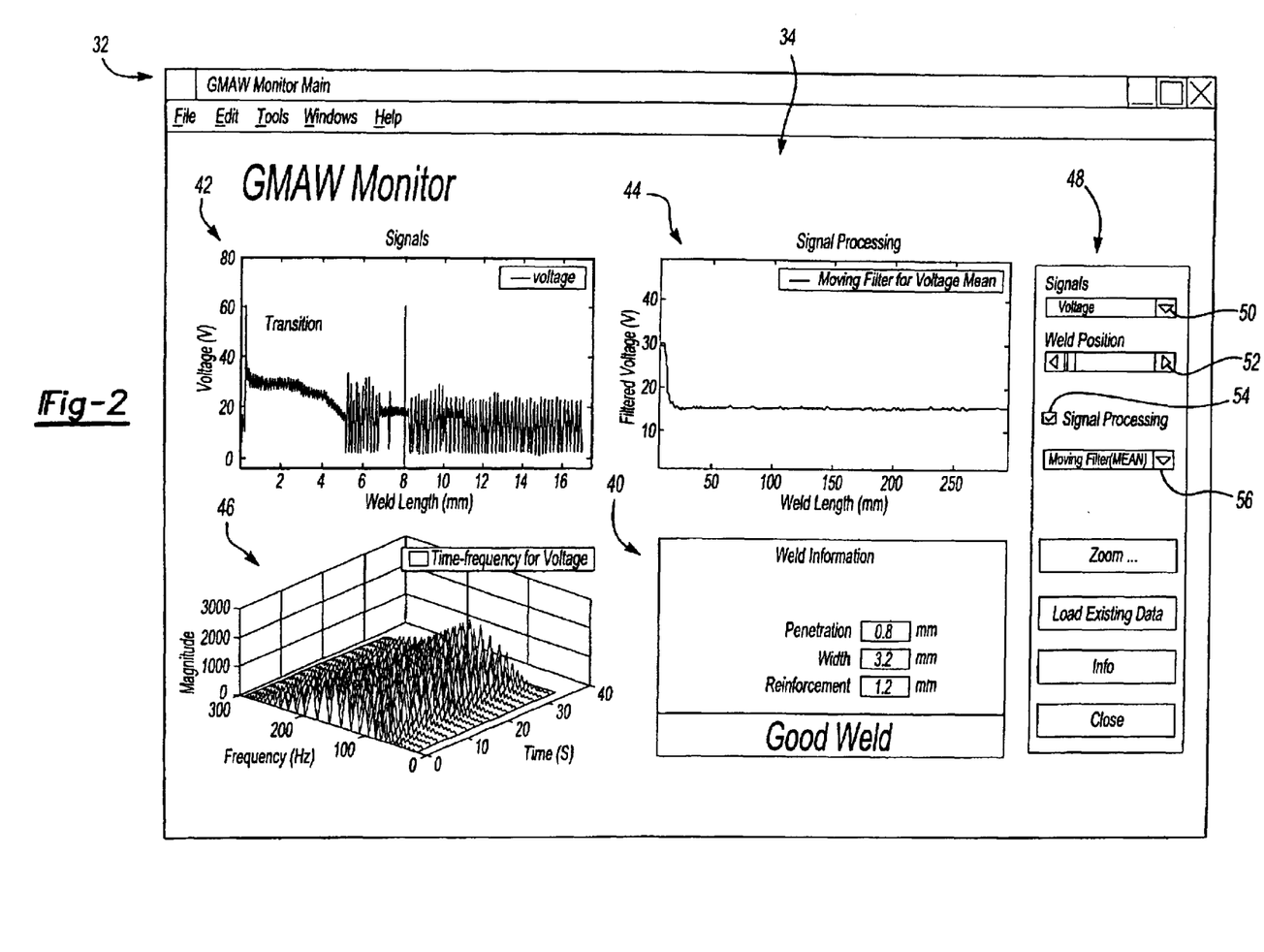
FIG. 2 is an illustration of an online monitoring display showing a graphical display of a welding process having good weld formation.
Figure 3:
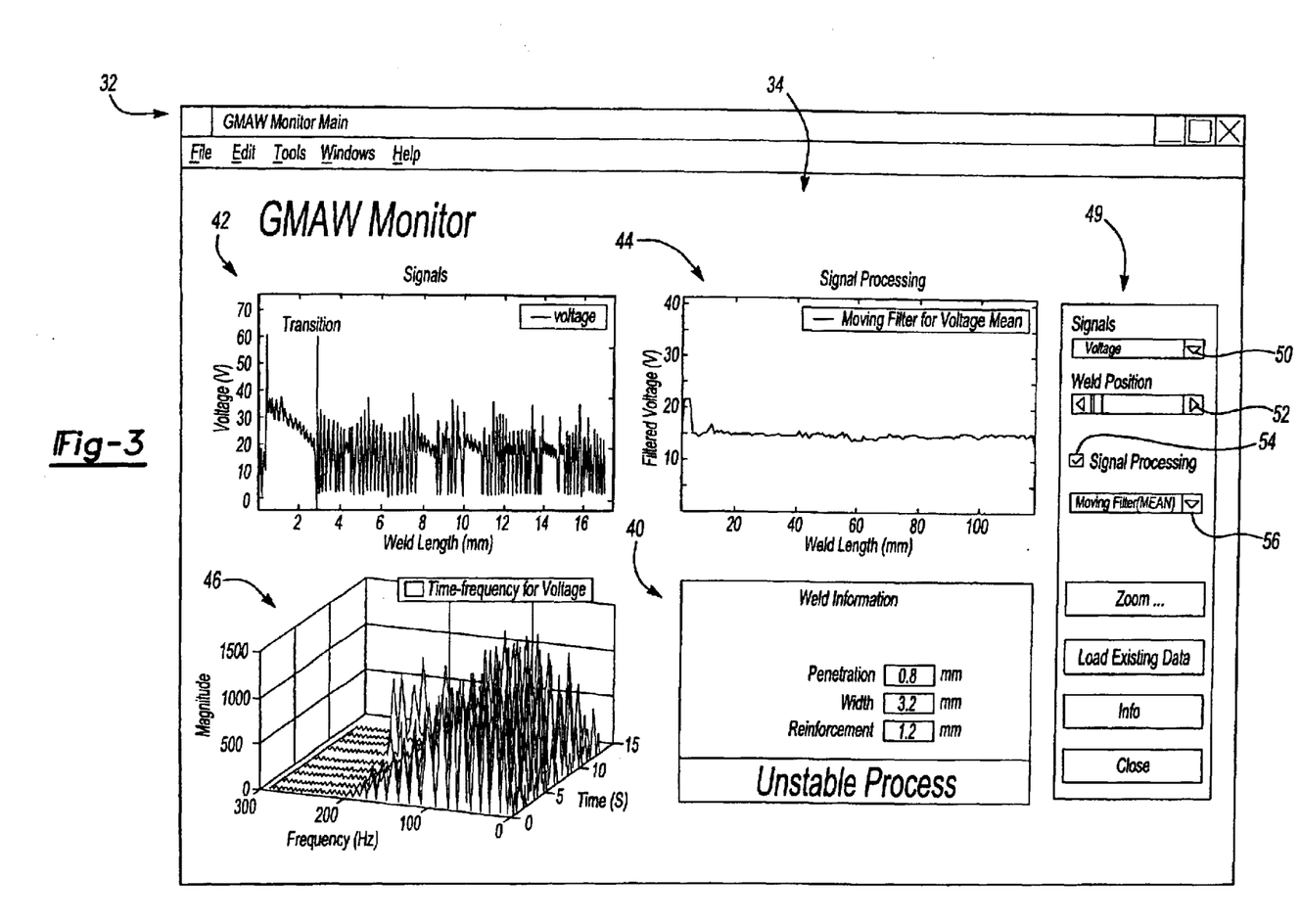
FIG. 3 is an illustration of an online monitoring display graphically showing multi-frequency components of a spectrum analysis indicating an unstable welding process.

Turning more specifically now to FIGS. 2–4, one preferred online monitoring display 34 provides a configurable display to allow a user to monitor weld quality, based upon signal information received by the computer system 12 from the welding machine 18, e.g., via the data acquisition system. The monitored acquired online welding signals may be displayed from either a current welding process if an online weld analysis is needed, or from a previously acquired welding process if an off-line weld analysis is needed.

One particularly attractive feature of the system of the present invention is that within the online monitoring display 34, there is preferably included a weld information sub-display 40 that outputs in real-time measurable data about a specific weld under consideration, such as (as illustrated in FIGS. 2–4) the weld penetration, the weld width, the weld reinforcement or a combination thereof. Also optionally included, as seen in FIGS. 2–4 is a display flag function. That is, preferably the computer system is pre-programmed with certain specified criteria for a weld, such as in the quality management database 26 (the selection of which may optionally be affected by the information entered through this or another display, such as the parameter setup display 36 of FIG. 5). Upon, analysis of the weld, if the measured characteristics of the weld are within certain of the pre-programmed criteria, then the GUI will be triggered to display a flag denoting that the criteria has been meet. For example, FIG. 2 illustrates a scenario in which the desired criteria have been met, thus triggering the "Good Weld" flag. In contrast, FIG. 3 illustrates a scenario where the criteria have been met for triggering an "Unstable Process" flag. Likewise, FIG. 4 illustrates a scenario where the criteria have been met for triggering a "Defective Weld" flag. As can be appreciated, a user can get substantially instantaneous notice if a welding operation has occurred as desired.

The online monitoring display 34 further can be configured to preferably, monitor acquired welding signal data, welding position, and signal processing results. One particularly preferred online monitoring display 34 has a real-time acquired welding signal sub-display 42, which tracks the welding voltage applied by the welding machine based upon time or (as shown) by location along the weld. Thus, as the welding machine is operated, its applied voltage is measured or otherwise monitored and inputted into the computer system 12 via the data acquisition system.

As also shown in FIG. 2, it is desirable to include a statistical signal processing results sub-display 44, which functions to display results of statistical processing algorithms performed on acquired welding data, which the acquired data is acquired by the data acquisition system, and a stability analysis sub-display 46 which functions to display a time-frequency spectrum analysis of short-circuiting occurrences occurring during a welding cycle, which data is acquired by the data acquisition system.

Another sub-display that is desirably included is a user interface sub-display 48, which functions to provide one or a plurality of selectable drop-down menus and configurable fields which allow a user to display and monitor acquired and processed welding signal data on the at least one on-line monitoring window.

The real time-acquired welding signal sub-display 42 illustrates a graphical display of a real-time acquired weld signals relative to a weld length. The real-time acquired welding signal sub-display 42 shows a welding voltage signal (y axis) plotted against a weld length (x axis) for a particular weld cycle. In an alternative embodiment (not shown) the welding signal sub-display 42, may display a current voltage signal (y axis) plotted against a weld length (x axis). The acquired signal data may be selected and monitored on the acquired welding signal sub-display 42 by selecting a welding signal type using a signal drop-down menu button 50 located in the user interface sub-display 48. Additionally, welding position may be determined by monitoring a welding position indicator 52 located in the user interface sub-display 48.

The statistical signal processing results sub-display 44 illustrates a filtered voltage or voltage mean (y axis) plotted against a weld length during a welding cycle. Signal processing results may be selected by first selecting a box 54 located in the user interface sub-display 48 and then by selecting a method of signal processing to be performed on the welding signals using an algorithm drop-down menu button 56. Preferably, the options available for signal processing will include a moving mean, a spectrum analysis, a standard deviation approach, or combinations thereof.

The stability analysis sub-display 46 illustrates a time-frequency spectrum analysis of a short-circuiting voltage magnitude for a particular weld cycle. Alternatively, the stability analysis sub-display 46 may illustrate a time-frequency spectrum analysis of a short-circuiting current magnitude for a particular weld cycle calculated by applying signal processing algorithms using measured welding values.

Turning now to FIG. 5, there is depicted one preferred approach for providing the parameter setup display 36. Under a preferred approach, the information inputted by a user for this display will controllably provide welding machine operating instructions. However, it is possible that the welding machine is separately programmed and the parameter setup display 36 is adapted for only receiving information about such separate programming for enabling the retrieval from the database of the expected values, e.g., for generating an output in accordance with the welding information sub-display 40 of FIGS. 2–4.

Thus, the parameter setup display 36 preferably will provide a welding conditions field 58 for obtaining information about the actual or expected welding conditions for a desired welding operation. The parameter set up display 36 may also include a workpiece information field 60, into which information about the workpiece to be welded can be inputted. Additionally, a data acquisition parameter portion 62 may be provided for allowing a user to specify the parameters over which sampling of the welding operation is to be monitored (e.g., the sample data measurement frequency, the length of the weld or both). A data log portion 64 may also be included, such as for affording the user the ability to create files, access files, and store data (e.g., into the database or otherwise into the memory means).

The welding conditions field 58 defines specific welding conditions for a user-identified welding process. Preferably, the welding conditions define a type of joint to be welded, a type of power source for the welding operation, an electrode wire feed rate, a value for a welding voltage supplied to the at least one welding machine 18, a welding speed of the at least one welding machine 18, a stick out value of a wire electrode from an electrode wire contact tube, a gas flow rate of a shielding gas supplied to a welding gun (not shown) in communication with the welding machine, and an angle of the welding gun relative to a base metal being welded.

The configurable data acquisition parameter portion 62 provides a configurable display to control data acquisition. Preferably, the configurable data acquisition parameter portion 62 defines a sample rate for acquiring welding signal data for a desired weld length.

The data log portion 64 provides a configurable display for selectively storing and retrieving acquired data to and from the data acquisition system associated memory means 24. More particularly, the stored data log is retrieved by specifying an associated file name of the stored data log using the configurable directory portion 66. Each data log may correspond with at least one welding or test cycle, or a plurality of welding data or test cycles. Additionally, each data cycle may be indexed using an associated counter, the sample counter may be selected by using the configurable sample counter portion 68.

FIG. 5 also illustrates in the parameter set-up display 36 a button 70 adapted for accessing an optional advanced set up display 38, more particularly illustrated in FIG. 6.

Thus, as seen in FIG. 6, one preferred system of the present invention invites a user to use the advanced set-up display 38 to enter information into fields 120,122, 124, 126, 128 corresponding to operating parameters selected from voltage, current, arc time, short-circuit time, heat input, condition number or combinations thereof, the fields 120, 122, 124, 126, 128 are further disposed within a variables threshold portion 96. Additionally, the variables threshold portion 96 provides a configurable condition number portion 140 having an associated help button 142 for selectably defining a threshold value used in signal conditioning of current and voltage signals acquired by the data acquisition system 22.

As will be appreciated, the system of the present invention can also be provided with pre-programmed user instructions, trouble-shooting tips, or the like, which may be accessible by one or more "help" buttons located within a display. For example, without limitation, FIG. 6 illustrates a plurality of help buttons 130, 132, 134, 136, 138 which upon selection will access a database of pre-programmed values that help to guide the user in the selection of process parameters. One or more algorithms may also be programmed for calculating values based upon input from a user. Thus it may be possible that a user will specify a particular voltage and a value will be automatically calculated for a current based upon an algorithm having a specified coefficient.

Additionally, the advanced set-up display 38 has a configurable calibration coefficient portion 72 for selectively entering calibration coefficients into corresponding current sensor and voltage sensor calibration fields, 74, 76. A current sensor calibration coefficient input into field 74 operates to selectively define a current sensor calibration coefficient to control the gain of an associated current sensor described further below, and a voltage sensor calibration coefficient input into field 76 operates to selectively define a voltage sensor calibration coefficient to control the gain of an associated voltage sensor described further below.

As indicated in the above, communications between the computer system 12 and the welding machine 18 take place through at least one communication interface 20, which may be a stand alone component or integrally associated with the computer or welding machine. Any suitable art-disclosed connection between the computer system 12 and the communication interface 20, and between the welding machine 18 and the communication interface 20 may be employed, such as wires, cables (e.g., a coaxial cable), busses, radiofrequency or other electromagnetic means, or otherwise.

The welding machine 18 will include one or more welding guns (not shown) or like devices adapted for gas metal arc welding and in turn is connected with a suitable power supply (such as a DC voltage supply, not shown) and gas supply (not shown). Referring again to FIG. 1, the welding machine 18 receives its operational commands from the controlling microprocessor 14.

The data acquisition system 22 is in communication with the controlling microprocessor 14 and is in further communication with the at least one welding machine 18. The data acquisition system 22 may be any suitable art-disclosed computer based memory and processor system that is in operable communication with the controlling microprocessor 14 via wires, cables, busses, radiofrequency or other electromagnetic means, or otherwise. The data acquisition system 22 is configured to acquire data from the welding machine 18. Preferably, the associated memory means 24 has sufficient memory capability to store several days of data acquired by the data acquisition system 22. The associated memory means 24 is capable of being accessed by the controlling microprocessor 14 and is in operative communication with the statistical signal processing system 28 for further analyzing and processing of data therefrom. The stored data may be retrieved from the data acquisition system associated memory means 24 by using, for instance, the data log portion 64 of the GUI 16 as shown in FIG. 5, The data acquisition system 22 further comprises at least two sensors, and a digital signal processor 82 in operable communication with the at least two sensors and in further operable communication with both the online monitoring controlling microprocessor 14 and the statistical signal processing system 28. Alternatively, the data acquisition system 22 may comprise a plurality of sensors, the plurality of sensors may be used to monitor a plurality of welding signals associated with the welding parameters defined in the welding parameter setup display. The digital signal processor 82 provides a signal conditioner 88 and an analog to digital converter board 90.

The sensors include at least one voltage sensor 84 suitable for measuring analog voltage signals communicated from the welding machine 18, and at least one current sensor 86 for measuring current signals communicated from the welding machine 18. Connection between the sensors 84, 86 and the computer data acquisition system 22 is by wires, cables, busses, radiofrequency or other electromagnetic means, or otherwise. Control of the gain of each sensor 84, 86 is performed by selectably defining sensor calibration coefficients, respectively, in the calibration coefficient portion 72 of the GUI advanced setup display 38 as shown in FIG. 6.

The data acquisition system 22 begins acquiring data when the voltage sensor 84 receives a triggering signal from the welding machine 18. The triggering signal is preferably a first rising edge of a welding voltage signal. The welding current and voltage signals transmitted during a gas metal arc welding cycle are respectively measured by the sensors 84, 86 and then are communicated to the digital signal processor 82 for processing.

The suitable signal conditioner 88 is provided for conditioning signals received from the sensors 84, 86. The analog to digital converter board 90, in turn, is preferably employed for digitizing conditioned signals and for communicating the digitized conditioned signals to the computer system 12. The digital signal processor 82 is in operable communication with the online monitoring system microprocessor 14 for processing signals acquired during data acquisition and is in further operable communication with the GUI 16 for graphically displaying acquired and processed signals on the online monitoring display 34.

A preferred signal conditioner 88 comprises an input port 92 for receiving analog current and voltage signals from the at least two sensors 84, 86, and an output port 94 for outputting conditioned signals received from the input port 92 to the analog to digital converter board 90. The signal conditioner 88 conditions the analog signals by converting the analog signals to a standard unit of measure using a conditioning number as defined in the condition number portion 140 of the GUI advanced setup display 38 as shown in FIG. 6. The signal conditioner 88 preferably is capable of attenuating and discriminating voltage and current welding signals measured by the at least two sensors 84, 86.

The analog to digital converter board 90 samples the conditioned analog signals at a predefined data acquisition sample rate as defined in the configurable data acquisition parameter portion 62 of the GUI welding parameter setup display 36. The analog to digital converter board 90 digitizes the analog signals transmitted from the signal conditioner output port 94 into discrete values representing the strength welding voltage and current signals sensed by the at least two sensors 84, 86 during a welding cycle. These discrete values are stored in the data acquisition system associated memory means 24.

The statistical processing system 28 is also preferably a computer based memory and processor system that is in operable communication with the data acquisition system 22 and data acquisition memory means 24 to further process and analyze acquired data.

The statistical signal processing system 28 uses the user defined welding parameters with respect to the acquired current, and voltage welding values stored in the data acquisition system associated memory means 24 using the quality management database 26 to further process the acquired welding signals.

The statistical signal processing system 28 performs additional signal conditioning to filter out acquired data not falling within the variables threshold range as defined in the variables threshold portion 96 of the welding parameter advanced setup display 38 as shown in FIG. 6. The statistical signal processing system 28 cooperates with the GUI 16 to selectively process the welding signal data communicated from the data acquisition system associated memory means 24 to the statistical signal processing system 28. The results of the statistical processed signals are then further processed according to a user-defined graphical display format and are communicated to the GUI 16 for selectively displaying the signal processing results on the online monitoring display 34.

The statistical processing system provides operational instructions to analyze and manipulate digital signal processed data retrieved from the data acquisition system 22 and the associated memory means 24. The operational commands comprise predefined algorithms that manipulate resulting values of the filtered signals falling within the specified variable thresholds to statistically determine a spectrum analysis, a moving mean, a moving standard deviation, and a weld bead geometry estimation for the acquired data. The spectrum analysis for the acquired data, for example, may be used to determine process stability. The moving mean, and standard deviation for the acquired data, for example, may be used to determine weld bead quality of each weld or a plurality of welds made during a welding process. Although not shown, additional statistical algorithms may be added to further statistically signal process the acquired welding data.

A moving mean algorithm preferably is performed during signal processing to produce the graph as shown in the statistical signal processing results sub-display 44 of FIGS. 2–4. In a preferred embodiment, FIG. 2 illustrates a graphical indication of a good weld wherein the moving mean voltage as shown in the statistical signal processing results sub-display 44 remains substantially constant. In contrast, the moving mean voltage as shown in FIG. 4 does not remain substantially constant and therefore, indicates a defective weld has been made. Advantageously, the statistical signal processor 28 uses the moving mean filter to calculate voltage averages (Va) or current averages (Ia) by filtering out any short peaks or drops of the voltages or currents, respectively, that do not fall within the required threshold values.

A spectrum analysis algorithm is performed during signal processing to produce the graph as shown in the stability analysis sub-display 46 of FIGS. 2–4. The stability of a gas metal arc welding process is determined by the frequency and timing of short-circuiting occurrences. Short-circuiting occurrences that occur during a gas metal arc welding cycle at a constant frequency for a finite period of time indicate a stable welding process.

Figure 7A:
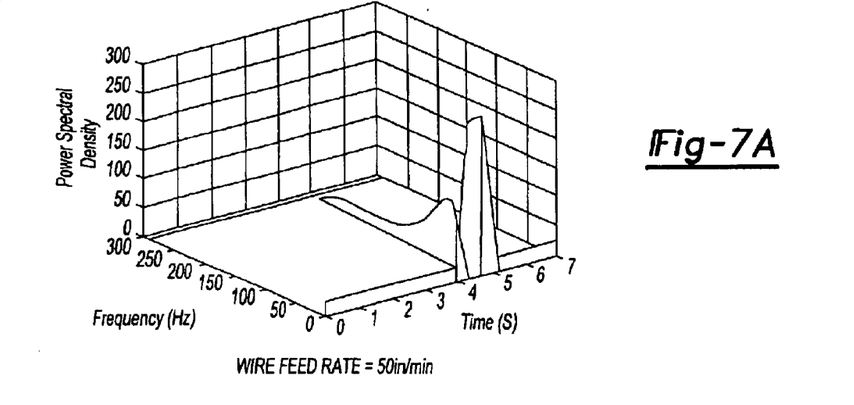
FIGS. 7(a)–(f) are graphical displays of time-frequency power spectral densities for varying wire feed rates generated using the online monitoring system of the present invention during a gas metal arc welding process.
Figure 7B:
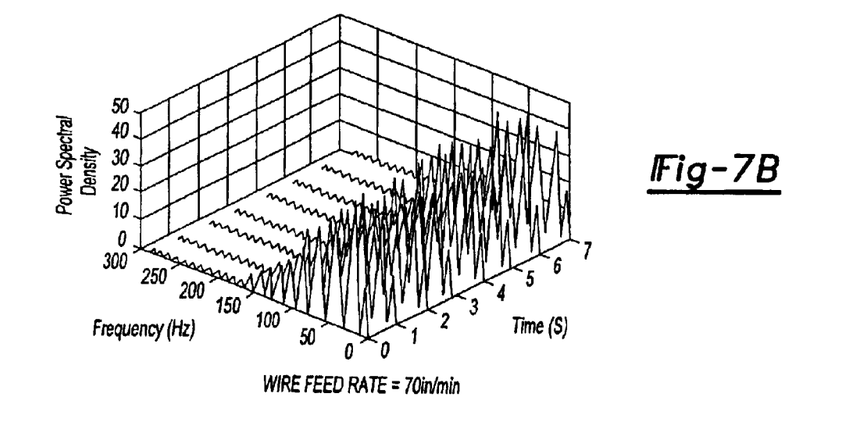
Figure 7C:
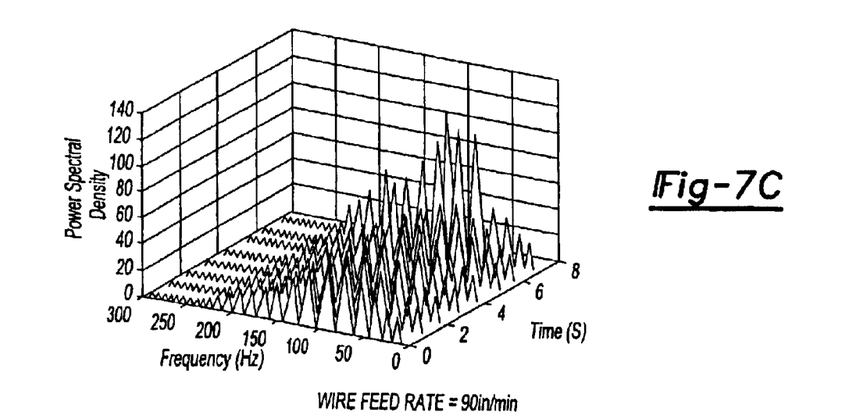
Figure 7D:
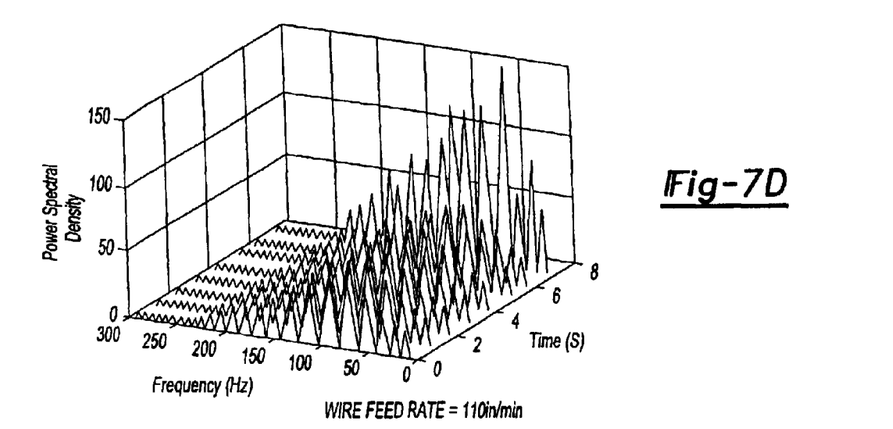
Figure 7E:
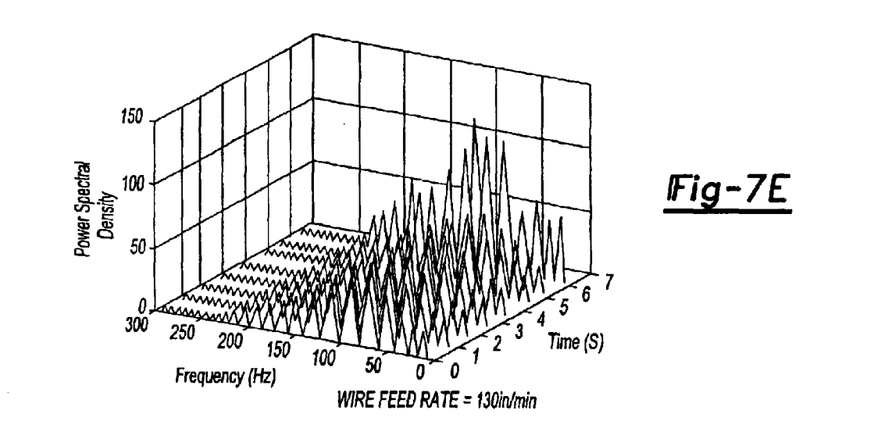
Figure 7F:
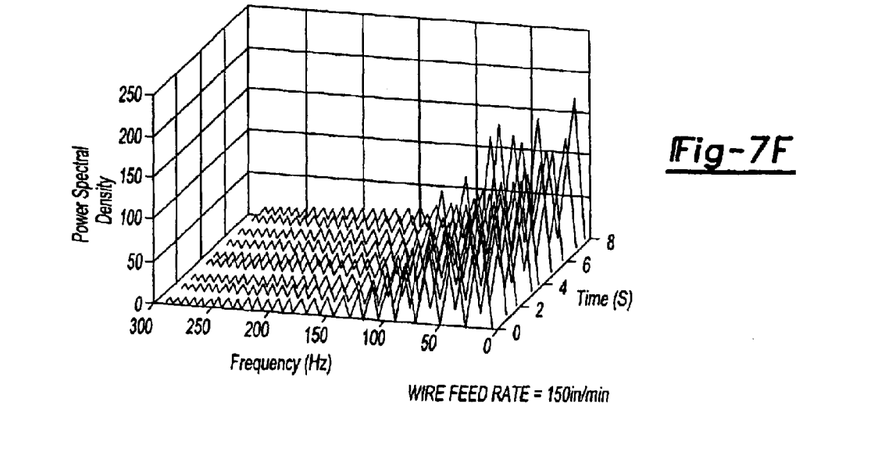

FIGS. 7(a) to 7(f) illustrate examples (without limitation) of a spectrum analysis of a power spectral density of welding current for different wire feed rates, respectively. In these figures, the x-axis is the short-circuiting frequency (Hz); the y-axis is the time, and the z-axis is the power or energy density of the short-circuiting power delivered to the gun. As shown, FIGS. 7(a), 7(b), 7(c), 7(e) and 7(f) show multi-frequency components of short-circuiting signals, which means that the welding processes were unstable. On the contrary, the short-circuiting frequency, shown in FIG. 7(d), has a very small variance and remains almost constant during the whole welding process. This suggests that the welding process for FIG. 7(d) is stable, and consequently, provides for a good weld quality.

A weld bead geometry estimation algorithm is used to calculate weld bead geometry estimation. As shown, the weld information sub-display 40 of FIG. 2 illustrates the case of a good lap weld with a weld width of 3.2 mm, a penetration of 0.8 mm, and a reinforcement value 1.2 mm of the weld characterized by relatively constant frequency of short-circuiting voltage magnitude.

Figure 8:
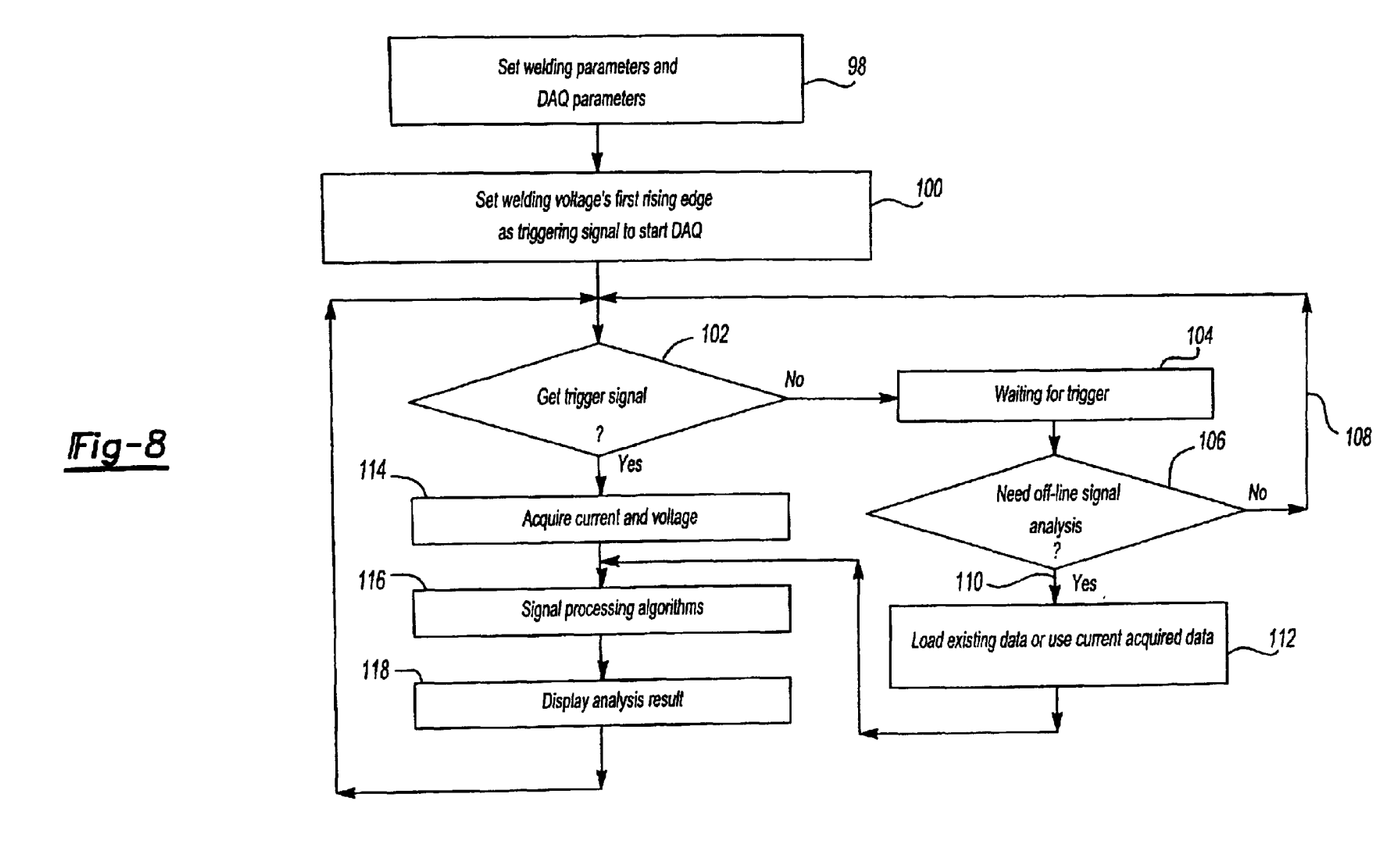
FIG. 8 is a flowchart showing a method of use for an online monitoring system in accordance with a preferred embodiment of the present invention.

According to a preferred embodiment as shown in FIG. 8, a preferred method of using the online monitoring system 10 to monitor and control a gas metal arc metal welding process is provided. The method comprises the steps of:

a) setting welding and data acquisition parameters (step 98);

b) setting a welding voltage's first rising edge as a triggering signal to start a data acquisition process (step 100), c) determining whether the triggering signal was received (step 102);

d) waiting for a triggering signal if a triggering signal was not received (step 104);

e) determining whether to perform an off-line signal analysis if a triggering signal was not received (step 106);

f) repeating steps c)–e) if an off-line signal analysis is not needed (step 108);

g) performing an off-line signal analysis if an off-line signal analysis is needed (step 110);

h) loading existing voltage and current data stored in a data acquisition memory means when an off-line signal analysis is performed (step 112);

i) acquiring current and voltage from an active welding cycle upon receiving a triggering signal (step 114);

j) performing signal processing algorithms on the acquired or the loaded current and voltage data (step 116); and k) displaying signal process analysis results on an online monitoring display (step 118).

In one preferred embodiment, as can be gleaned from the drawings, the present invention is employed for GMAW a steel sheet, and particularly as part of the manufacture of an automotive vehicle. However, the present invention can be employed for other welding processes, materials and applications.

From the foregoing, it should be appreciated that a system and method are provided for monitoring a welding process. While a preferred exemplary embodiment has been presented in the foregoing detailed description, it should be understood that a vast number of variations exist and this preferred exemplary embodiment is merely an example, and it is not intended to limit the scope, applicability or configuration of the invention in any way. Rather, the foregoing detailed description provides those of ordinary skill in the art with a convenient guide for implementing a preferred embodiment of the invention and various changes can be made in the function and arrangements of the exemplary embodiment without departing from the spirit and scope of the appended claims.

What is claimed is:

1. An online monitoring system for monitoring a short-circuiting gas metal arc welding process, the online monitoring system comprising:

(a) a computer having
 (i) a controlling microprocessor, and
 (ii) a graphical user interface comprising at least one monitoring window having a plurality of selectable sub-displays, said sub-displays comprising,
  (A) an online monitoring display for graphically displaying acquired data and signal processing results and for real time monitoring of weld quality based upon signal information received by the computer from a welding machine via a data acquisition system, said monitoring display comprising sub-displays of weld information, statistical signal processing results, and welding stability analysis;
  (B) a parameter setup display for setting up welding parameters and data acquisition parameters used in a data acquisition process during a welding process; and
  (C) an advanced set-up display;

(b) at least one welding machine in operable communication with the computer, the welding machine having at least one welding gun in further operable communication with the welding machine;

(c) a communication interface for interfacing communication between the at least one welding machine and the computer;

(d) a data acquisition system adapted for acquiring welding signal data from the welding machine, wherein the data acquisition system is in operable communication with the controlling microprocessor and is in further communication with the at least one welding machine for acquiring welding signal data from the at least one welding machine, and wherein the data acquisition system has an associated memory means;

(e) a quality management database for storing at least one of welding signal data, monitoring results, and diagnostic results in the data acquisition system associated memory means; and (f) a statistical signal processing system in communication with the data acquisition system for processing the welding signal data stored in the data acquisition system associated memory means and in further communication with the communication interface for communicating processed welding signal data to the graphical user interface.

2. The online monitoring system of claim 1, wherein the online monitoring display comprises:

(a) a weld information sub-display, the weld information sub-display outputs real-time measurable data about a specific weld under consideration;

(b) a real-time acquired welding signal sub-display, the real-time acquired welding signal sub-display tracks a welding voltage applied by the at least one welding machine based upon time or by location along a weld;

(c) a statistical signal processing results sub-display, the statistical signal processing results sub-display displays results of statistical processing algorithms performed on acquired welding data, wherein the acquired data is acquired by the data acquisition system;

(d) a stability analysis sub-display, the stability analysis sub-display displays a time-frequency spectrum analysis of short-circuiting occurrences occurring during a welding cycle;

(e) a user interface sub-display, the user interface sub-display provides at least one selectable drop-down menu and at least one selectable button which allow a user to selectively display acquired and signal processed welding signal data on the at least one on-line monitoring window.

3. The online monitoring system of claim 1 wherein the parameter setup display comprises:

(a) a welding conditions field for obtaining information about actual or expected welding conditions for a desired welding application;

(b) a workpiece information field for defining information about a workpiece to be welded;

(c) a data acquisition parameter portion for allowing a user to specify parameters over which sampling of a welding operation is to be monitored, the data acquisition parameter portion allows a user to define a sample rate for acquiring welding signal data for a desired weld length; and (d) a data log portion for allowing a user to selectively store data, create files, and access files.

4. The online monitoring system of claim 3 wherein the welding conditions field defines specific welding conditions for a user-identified welding process, the welding conditions defined comprise:

(a) a type of joint to be welded;

(b) a type of power source for the welding operation;

(c) an electrode flux wire feed rate;

(d) a value for a welding voltage supplied to the at least one welding machine;

(e) a welding speed of the at least one welding machine;

(f) a stick out value of a wire flux electrode from an electrode wire flux cover;

(g) a gas flow rate of a shielding gas supplied to the at least one welding gun in communication with the welding machine; and (h) an angle of a welding gun in communication with the at least one welding gun in communication with the welding machine relative to a base metal being welded.

5. The online monitoring system of claim 3, wherein the advanced set-up display comprises:

(a) a configurable calibration coefficient portion for selectively entering calibration coefficients into corresponding current sensor and voltage sensor calibration fields; and (b) a variables threshold portion having
(i) fields corresponding to operating parameters selected from voltage, current, arc-time, short-circuit time, and heat input, the fields each having an associated help button located within the advanced set-up display for accessing a database of pre-programmed values that help to guide a user in the selection of process parameters, and
(ii) a configurable condition number portion having an associated help button for selectably defining a threshold value used in signal conditioning of current and voltage signals acquired by the data acquisition system.

6. The online monitoring system of claim 3, wherein the data acquisition system further comprises:

(a) at least two sensors, the at least two sensors having
(i) at least one voltage sensor for measuring analog voltage signals communicated from the at least one welding machine to the at least one voltage sensor, and
(ii) at least one current sensor for measuring current signals communicated from the at least one welding machine to the at least one current sensor; and (b) a digital signal processor in operable communication with the at least two sensors and in further operable communication with both the online monitoring controlling microprocessor and the statistical signal processing system.

7. The online monitoring system of claim 6, wherein the at least two sensors comprise:

a plurality of sensors, the plurality of sensors may be used to monitor a plurality of welding signals associated with the welding parameters defined in the welding parameter setup display; and a digital signal processor in operable communication with the at least two sensors and in further operable communication with both the online monitoring controlling microprocessor and the statistical signal processing system.

8. The online monitoring system of claim 7, wherein the digital signal processor is in operable communication with the online monitoring system microprocessor for processing signals acquired during data acquisition and is in further operable communication with the graphical user interface for graphically displaying acquired and processed signals on the online monitoring display, the digital signal processor comprises:

(a) a signal conditioner for conditioning signals received from the at least two sensors, respectively; and (b) an analog to digital converter board for digitizing conditioned signals and for communicating the digitized conditioned signals to the quality management database for storage in the data acquisition system associated memory means.

9. The online monitoring system of claim 8 wherein the signal conditioner comprises:
   (a) an input port for receiving analog current and voltage signals from the at least two sensors, respectively; and
   (b) an output port for outputting conditioned analog signals received from the input port to the analog to digital converter board, wherein the signal conditioner is capable of attenuating and discriminating voltage and current welding signals measured by the at least two sensors.

10. The online monitoring system of claim 9 wherein the analog to digital converter board is used for
    (a) sampling conditioned analog signals at a predefined data acquisition sample rate;
    (b) digitizing the analog signals transmitted from the signal conditioner output port into discrete values representing a signal strength of signals sensed by the at least two sensors during a welding cycle; and
    (c) storing the discrete values in the data acquisition system associated memory means.

11. The online monitoring system of claim 6, wherein the data acquisition system begins acquiring data when the at least one voltage sensor receives a triggering signal from the at least one welding machine.

12. The online monitoring system of claim 11 wherein the triggering signal comprises a first rising edge of a welding voltage signal.

13. The online monitoring system of claim 3 wherein the statistical signal processing system cooperates with the graphical user interface to selectively process the welding signal data communicated from the data acquisition system associated memory means to the statistical signal processing system by performing predefined algorithms to determine quality, stability, and geometry estimation of welds made during a welding process.

14. The online monitoring system of claim 13 wherein the predefined algorithms comprise:
    a spectrum analysis algorithm for determining a spectrum analysis for frequency and timing of short-circuiting signals occurrences occurring during a monitored welding process;
    a moving mean algorithm for filtering out signals not falling within predefined variable thresholds;
    a standard deviation algorithm for determining a standard deviation of the, acquired welding data; and
    a weld bead geometry algorithm for estimating weld bead geometry of a weld formed during the GMAW process.

15. The online monitoring system of claim 13, wherein statistically signal processed data results of the statistical processed signals are processed according to a user-defined graphical display format and are communicated to the graphical user interface for selectively displaying the signal processing results on the online monitoring display.

16. The online monitoring system of claim 1, wherein the short-circuiting gas metal arc welding process monitors welding operations performed using low carbon sheet steel.

17. An online monitoring system for monitoring a short-circuiting gas metal arc welding process, the online monitoring system comprising:
    (a) a computer having
       (i) a controlling microprocessor, and
       (ii) a graphical user interface for providing a configurable interface for a user of the computer, the graphical user interface having a monitoring window, the monitoring window having configurable sub-displays, the configurable sub-displays having
          (A) an online monitoring display for graphically displaying acquired data and signal processing results,
          (B) a parameter setup display for setting up welding parameters and data acquisition parameters used in a data acquisition process during a welding process, and
          (C) an advanced-set-up display having
             (I) a configurable calibration coefficient portion for selectively entering calibration coefficients into corresponding current sensor and voltage sensor calibration fields, and
             (II) a variables threshold portion for defining threshold operating parameters to be used during a welding process;
    (b) at least one welding machine in operable communication with the computer;
    (c) a communication interface for interfacing communication between the at least one welding machine and the computer;
    (d) a data acquisition system in operable communication with the controlling microprocessor and in further communication with the at least one welding machine for acquiring welding signal data from the at least one welding machine, the data acquisition system having an associated memory means;
    (e) a quality management database for storing at least one of welding signal data, monitoring results, and diagnostic results in the data acquisition system associated memory means; and
    (f) a statistical signal processing system in communication with the data acquisition system for processing the welding signal data stored in the data acquisition system associated memory means and in further communication with the communication interface for communicating processed welding signal data to the graphical user interface.

18. A method of using the online monitoring system of claim 1 to monitor and control a gas metal arc metal welding process according to a user defined format, the method comprising the steps of:
    a) setting welding and data acquisition parameters;
    b) setting a welding voltage's first rising edge as a triggering signal to start a data acquisition process,
    c) determining whether the triggering signal was received;
    d) waiting for a triggering signal if a triggering signal was not received;
    e) determining whether to perform an off-line signal analysis if a triggering signal was not received;
    f) repeating steps c)–e) if an off-line signal analysis is not needed;
    g) performing an off-line signal analysis if an off-line signal analysis is needed;
    h) loading existing voltage and current data stored in a data acquisition memory means when an off-line signal analysis is performed;
    i) acquiring current and voltage from an active welding cycle upon receiving a triggering signal;
    j) performing signal processing algorithms on the acquired or the loaded current and voltage data.

* * * * *